United States Patent
Duffy et al.

(10) Patent No.: US 7,650,371 B2
(45) Date of Patent: Jan. 19, 2010

(54) FINALIZABLE OBJECT USAGE IN SOFTWARE TRANSACTIONS

(75) Inventors: John Joseph Duffy, Renton, WA (US); David Detlefs, Westford, MA (US); Michael M. Magruder, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 11/639,021

(22) Filed: Dec. 14, 2006

(65) Prior Publication Data

US 2008/0147757 A1 Jun. 19, 2008

(51) Int. Cl.
G06F 7/00 (2006.01)
(52) U.S. Cl. .................. 707/206; 707/205; 707/200; 711/170; 711/173
(58) Field of Classification Search ............ 707/104.1, 707/100, 10, 206, 205; 711/170, 173
See application file for complete search history.

(56) References Cited

U.S. PATENT DOCUMENTS

| | | | | | |
|---|---|---|---|---|---|
| 5,551,027 | A | * | 8/1996 | Choy et al. | 707/201 |
| 5,732,238 | A | * | 3/1998 | Sarkozy | 711/135 |
| 5,745,703 | A | * | 4/1998 | Cejtin et al. | 709/238 |
| 5,754,849 | A | * | 5/1998 | Dyer et al. | 707/101 |
| 5,857,204 | A | * | 1/1999 | Lordi et al. | 707/202 |
| 5,960,194 | A | * | 9/1999 | Choy et al. | 707/102 |
| 5,983,225 | A | * | 11/1999 | Anfindsen | 707/8 |
| 6,018,746 | A | * | 1/2000 | Hill et al. | 707/202 |
| 6,047,295 | A | * | 4/2000 | Endicott et al. | 707/206 |
| 6,314,435 | B1 | * | 11/2001 | Wollrath et al. | 707/206 |
| 6,393,439 | B1 | * | 5/2002 | Houldsworth et al. | 707/206 |
| 6,539,396 | B1 | * | 3/2003 | Bowman-Amuah | 707/103 R |
| 6,615,253 | B1 | * | 9/2003 | Bowman-Amuah | 709/219 |

(Continued)

OTHER PUBLICATIONS

Marathe et al., "Adaptive Software Transactional Memory", Date: May 2005, http://ftp.cs.rochester.edu/u/scott/papers/2005_TR868_ASTM.pdf.

(Continued)

*Primary Examiner*—Khanh B Pham
*Assistant Examiner*—Leon Harper

(57) ABSTRACT

Various technologies and techniques are disclosed for providing a software transactional memory system that supports allocation and use of finalizable objects inside transactions. By supporting such finalizable object usage inside a software transactional memory system, correct behavior is maintained when a garbage collector must determine when a particular one or more of the objects are eligible for finalization. A to-be-finalized set is provided for a transaction. An object is placed into the to-be-finalized set for the transaction whenever a finalizable object is allocated within the transaction. A finalize indicator is set for each object in the to-be-finalized set at an appropriate time to indicate that the objects are eligible for finalization. For example, if the transaction is ready to commit and the transaction is an open transaction, then the to-be-finalized set is traversed and a finalize indicator is set for each object to indicate they are eligible for finalization.

12 Claims, 8 Drawing Sheets

U.S. PATENT DOCUMENTS

| | | | |
|---|---|---|---|
| 6,618,851 B1* | 9/2003 | Zundel et al. | 717/103 |
| 6,760,736 B2* | 7/2004 | Waldo et al. | 707/206 |
| 6,763,440 B1* | 7/2004 | Traversat et al. | 711/159 |
| 6,816,875 B2* | 11/2004 | Wollrath et al. | 707/206 |
| 6,856,993 B1* | 2/2005 | Verma et al. | 707/101 |
| 6,928,460 B2* | 8/2005 | Nagarajan et al. | 707/206 |
| 6,993,770 B1* | 1/2006 | Detlefs et al. | 719/315 |
| 7,069,279 B1* | 6/2006 | Rau et al. | 707/206 |
| 7,257,595 B2* | 8/2007 | Verma et al. | 707/101 |
| 2002/0116409 A1* | 8/2002 | Sokolov et al. | 707/206 |
| 2004/0024720 A1* | 2/2004 | Fairweather | 706/46 |
| 2005/0097103 A1* | 5/2005 | Zane et al. | 707/6 |
| 2006/0095483 A1* | 5/2006 | Holt | 707/206 |

OTHER PUBLICATIONS

Marathe et al., "Lowering the Overhead of Nonblocking Software Transactional Memory", Date: Mar. 2006, https://urresearch.rochester.edu/retrieve/5928/tr893.pdf.

Moss et al., "Nested Transactional Memory: Model and Preliminary Architecture Sketches", Date: Oct. 2005, https://urresearch.rochester.edu/retrieve/4806/moss-hosking.pdf.

* cited by examiner

FINALIZABLE OBJECT USAGE IN SOFTWARE TRANSACTIONS

BACKGROUND

In environments that provide managed code execution, such as with the Common Language Runtime (CLR) provided by MICROSOFT® or with Java, an object and its state usually have one and the same lifetime. In other words, when a garbage collector reclaims the memory used by an object, all of the object's associated state goes away. Some objects, however, such as those accessing the file system, must interact with data outside of the garbage collector's heap. A finalizer method is often provided for such objects to ensure that an object's external state can be cleaned up just before its memory is reclaimed.

Current software transactional memory (STM) systems do not support finalization of objects. Software transactional memory is a concurrency control mechanism analogous to database transactions for controlling access to shared memory in concurrent computing. A transaction in the context of transactional memory is a piece of code that executes a series of reads and writes to shared memory.

SUMMARY

Various technologies and techniques are disclosed for providing a software transactional memory system that supports allocation and use of finalizable objects inside a transaction. By supporting such finalizable object usage in a software transactional memory system, a correct behavior is maintained when a garbage collector must determine when a particular one or more of the objects are eligible for finalization. A to-be-finalized set is provided for a transaction. An object is placed into the to-be-finalized set for the transaction whenever a finalizable object is allocated within the transaction. The garbage collector is later notified for each object in this set that, once the object is found to be unreachable, it must be finalized. In one implementation, a finalize indicator is set for each object in the to-be-finalized set at an appropriate time to indicate that the objects are eligible for finalization by the garbage collector. In one implementation, if the transaction is ready to commit and the transaction is either the topmost transaction (i.e. does not have a parent) or an open nested transaction, then the to-be-finalized set is traversed and a finalize indicator is set for each object to indicate they are eligible for finalization.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
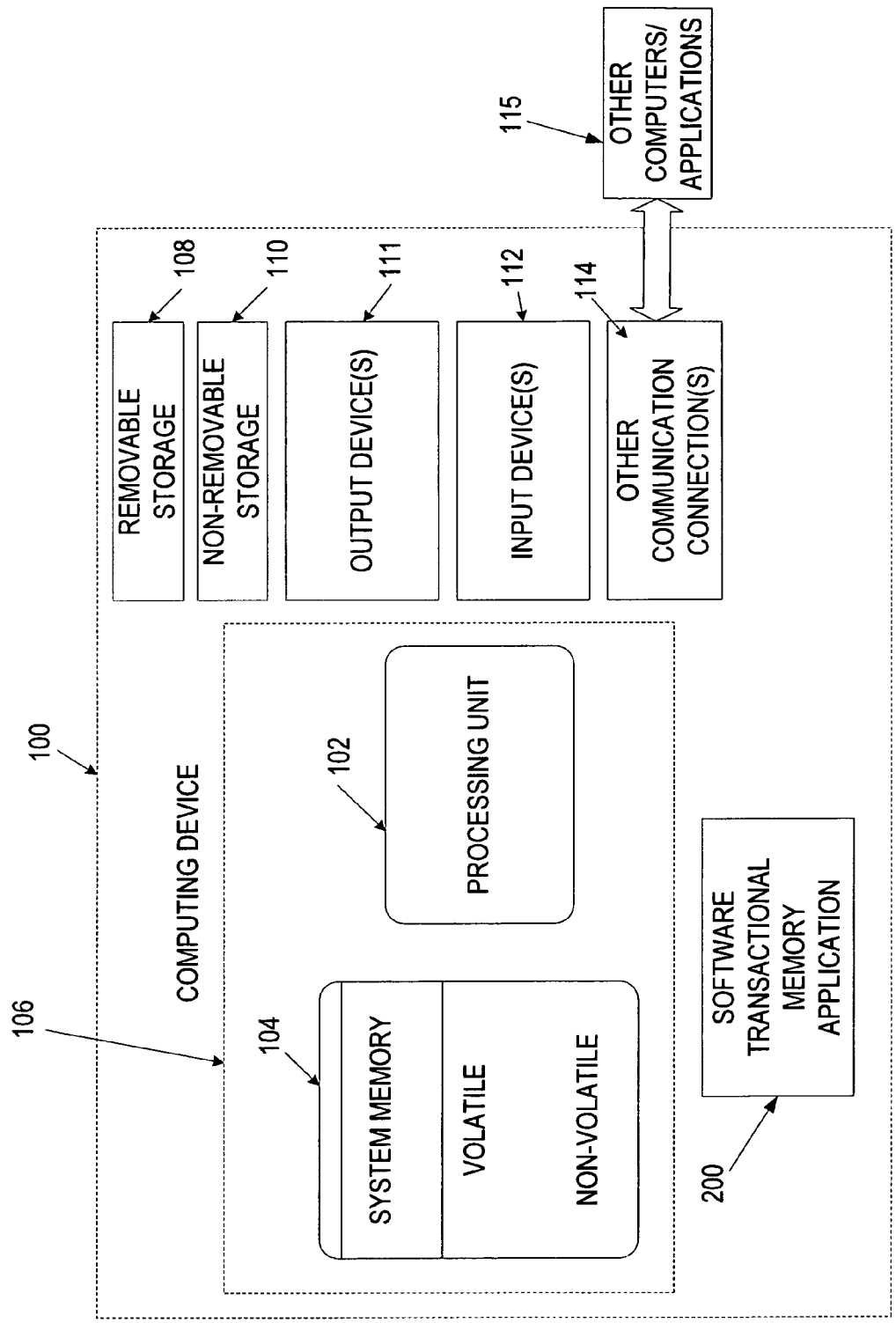
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

A software transactional memory system is provided that supports allocation and use of finalizable objects inside a transaction. A to-be-finalized set is used to track objects that are created during the transaction. At a particular appropriate time (such as when a non-nested transaction commits), a logical IsFinalizable indicator is set (or other suitable mechanism employed) for the objects in the to-be-finalized set to indicate to the garbage collector that the objects are eligible for finalization as soon as they are found to be unreachable.

The term finalizer method (e.g. finalizer) as used herein includes the code that is responsible for running cleanup code. The finalizer is typically run from the garbage collector automatically before an object's memory is reclaimed. A finalizable type is a type that defines a finalizer method. A finalizable object is an object instance of a type with a finalizer. When such an object dies, it will be finalized by the garbage collector. Finalization, or finalized means the process of invoking finalizer methods on finalizable objects such that they can be reclaimed.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software transactional memory application 200. Software transactional memory application 200 will be described in further detail in FIG. 2.

Figure 2:
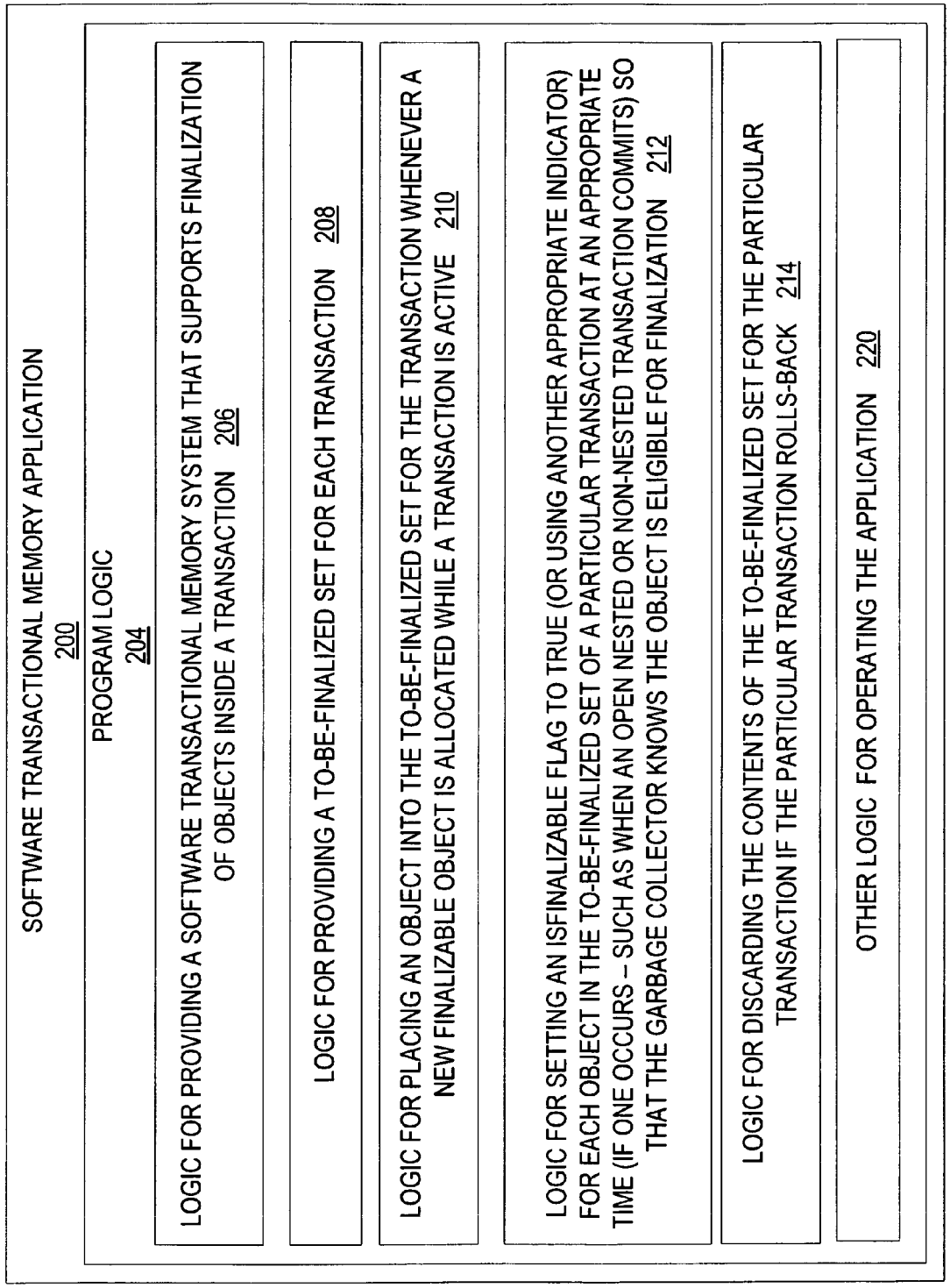
FIG. 2 is a diagrammatic view of a software transactional memory application of one implementation operating on the computer system of FIG. 1.

Turning now to FIG. 2 with continued reference to FIG. 1, a software transactional memory application 200 operating on computing device 100 is illustrated. Software transactional memory application 200 is one of the application programs that reside on computing device 100. However, it will be understood that software transactional memory application 200 can alternatively or additionally be embodied as computer-executable instructions on one or more computers and/or in different variations than shown on FIG. 1. Alternatively or additionally, one or more parts of software transactional memory application 200 can be part of system memory 104, on other computers and/or applications 115, or other such variations as would occur to one in the computer software art.

Software transactional memory application 200 includes program logic 204, which is responsible for carrying out some or all of the techniques described herein. Program logic 204 includes logic for providing a software transactional memory system that supports finalization of objects inside a transaction 206; logic for providing a to-be-finalized set for each transaction 208; logic for placing an object into the to-be-finalized set for the transaction whenever a new finalizable object is allocated while a transaction is active (e.g. a transaction-born object) 210; logic for setting an IsFinalizable flag to true (or using another appropriate indicator) for each object in the to-be-finalized set of a particular transaction at an appropriate time (if one occurs—such as when an open nested or non-nested transaction commits) so that the garbage collector knows the object is eligible for finalization 212; logic for discarding the contents of the to-be-finalized set for a particular transaction if the particular transaction rolls back 214; and other logic for operating the application 220. In one implementation, program logic 204 is operable to be called programmatically from another program, such as using a single call to a procedure in program logic 204.

Figure 3:
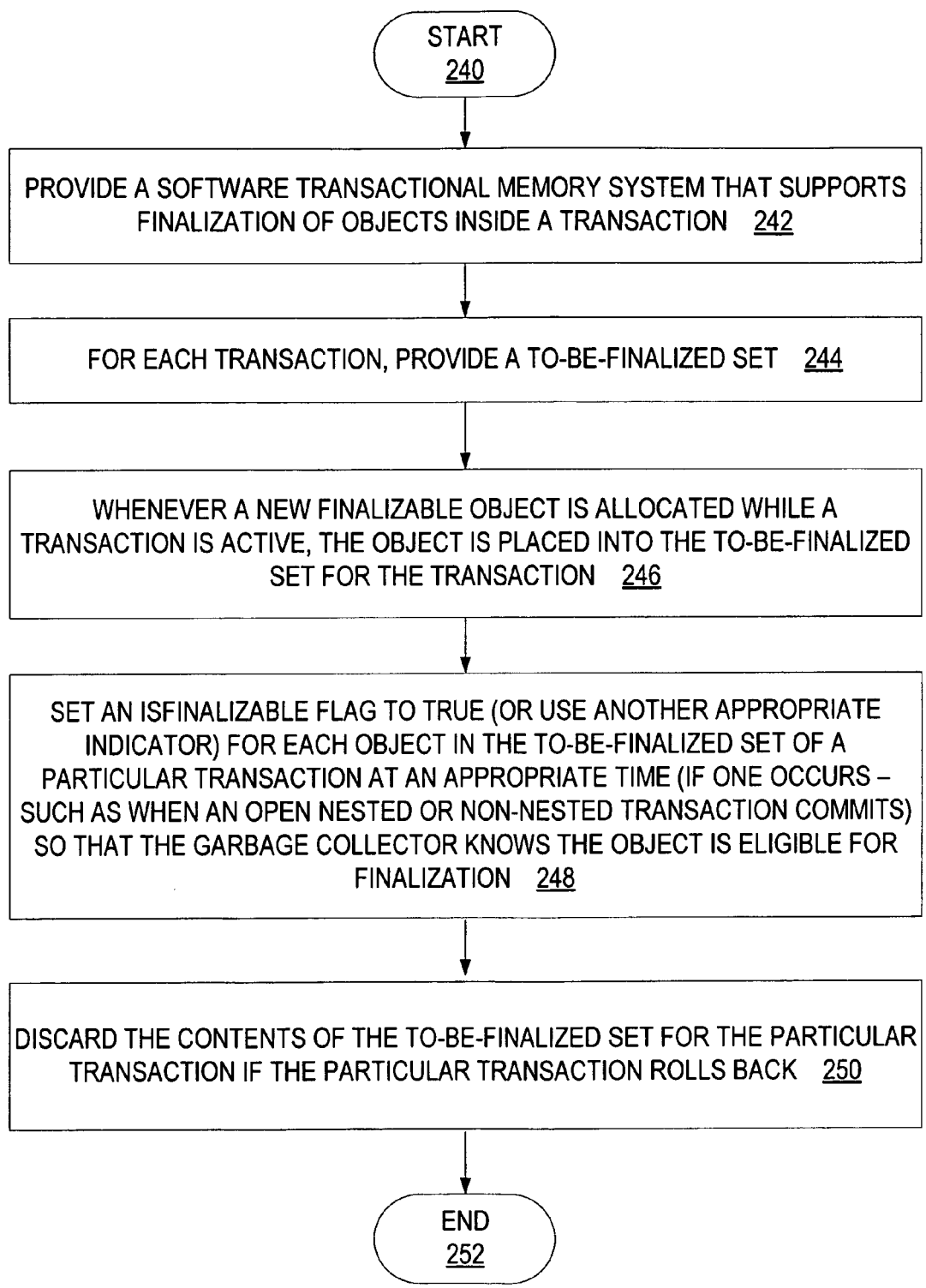
FIG. 3 is a high-level process flow diagram for one implementation of the system of FIG. 1.

Turning now to FIGS. 3-9 with continued reference to FIGS. 1-2, the stages for implementing one or more implementations of software transactional memory application 200 are described in further detail. FIG. 3 is a high level process flow diagram for software transactional memory application 200. In one form, the process of FIG. 3 is at least partially implemented in the operating logic of computing device 100. The procedure begins at start point 240 with providing a software transactional memory system that supports finalization of objects inside a transaction (stage 242). For each transaction, a to-be-finalized set is provided (stage 244). Whenever a new finalizable object is allocated while a transaction is active (e.g. a transaction-born object), the object is placed into the to-be-finalized set for the transaction (stage 246). An IsFinalizable flag is set to True (or another appropriate indicator is used) for each object in the to-be-finalized set of a particular transaction at an appropriate time (if one occurs—such as when an open nested or non-nested transaction commits) so that the garbage collector know the object is eligible for finalization (stage 248). In other words, some mechanism is employed (such as setting an IsFinalizable indicator) so the garbage collector is notified for each object in the set that, once the object is found to be unreachable, it must be finalized. If the garbage collector finds the object to be unreachable before the end of the transaction, then the object's membership in the to-be-finalized set keeps the object alive. If the particular transaction rolls back, the system discards the contents of the to-be-finalized set for the particular transaction (stage 250). The procedure ends at end point 252.

Figure 4:
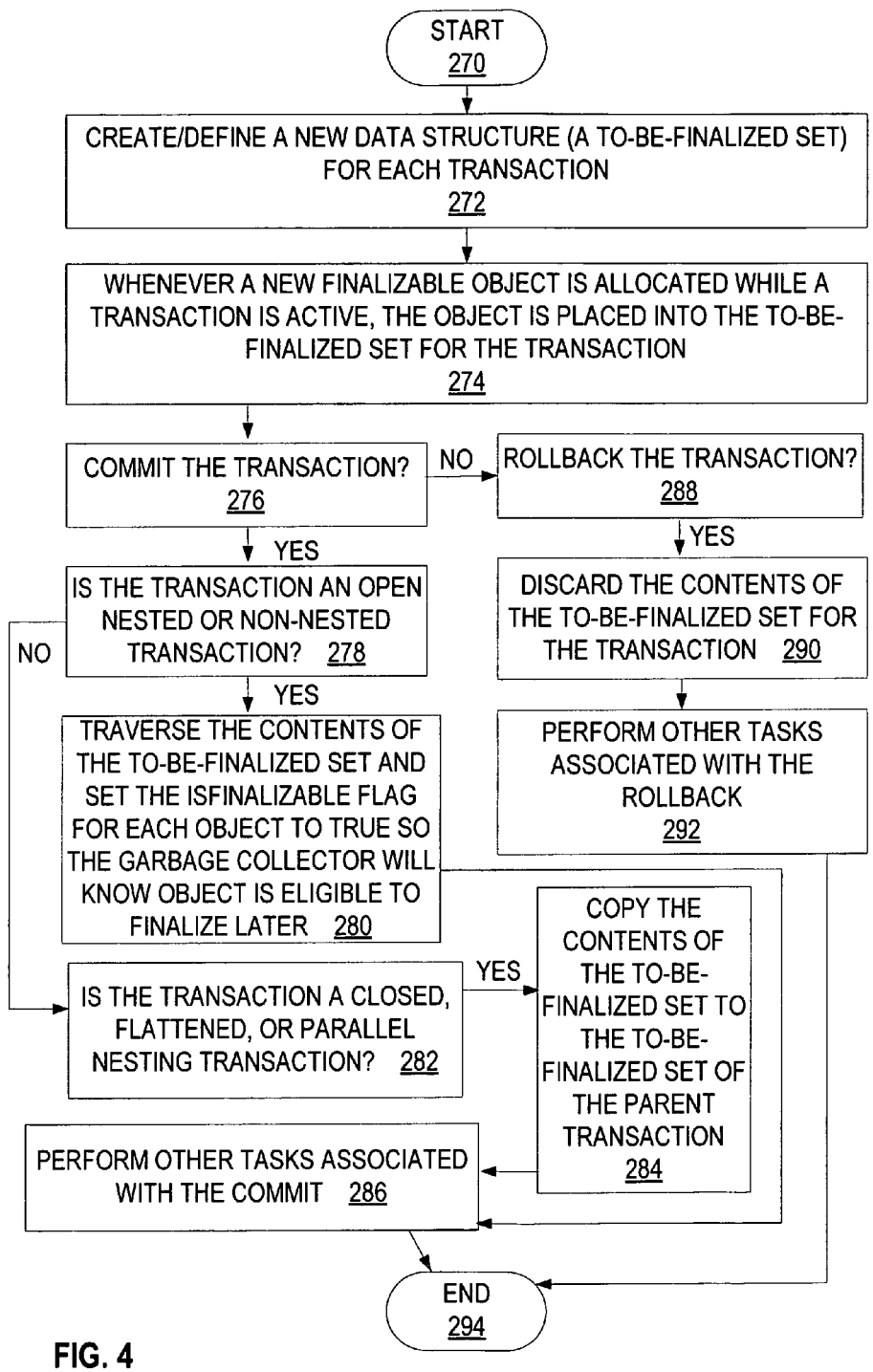
FIG. 4 is a process flow diagram for one implementation of the system of FIG. 1 illustrating the stages involved in providing a transactional memory system that supports finalization of objects within a transaction by using a to-be-finalized set.

FIG. 4 illustrates one implementation of the stages involved in providing a transactional memory system that supports finalization of objects within a transaction by using a to-be-finalized set. In one form, the process of FIG. 4 is at least partially implemented in the operating logic of computing device 100. The procedure begins at start point 270 with creating/defining a new data structure (a to-be-finalized set) for each transaction (stage 272). Whenever a new finalizable object is allocated while a transaction is active (e.g. a transaction-born object), the object is placed into the to-be-finalized set for the transaction (stage 274). If the transaction is to be committed (decision point 276), and the transaction is an open nested or non-nested transaction (decision point 278), then the system traverses the contents of the to-be-finalized set and sets the IsFinalizable flag for each object to true so the garbage collector will know that the object is eligible to finalize later (stage 280). If the transaction is to be committed (decision point 276), and the transaction is a closed, flattened, or parallel nesting transaction (decision point 282), then the contents of the to-be-finalized set are copied to the to-be-finalized set of the parent transaction (stage 284). In either event, other tasks associated with the commit are performed (stage 286).

If the transaction is not to be committed (decision point 276), but instead is to be rolled-back (decision point 288), then the contents of the to-be-finalized set are discarded for the transaction (stage 290), thereby ensuring that the garbage collector will not attempt to finalize such objects at a later point. In some implementations described in later sections herein, one or more other mechanisms are used by a garbage collector to ensure that some external resources that still need to be cleaned up are indeed cleaned up, even though the transaction was rolled back and the to-be-finalized set was emptied. Other tasks associated with the rollback are also performed (stage 292). The procedure ends at end point 294.

Figure 5:
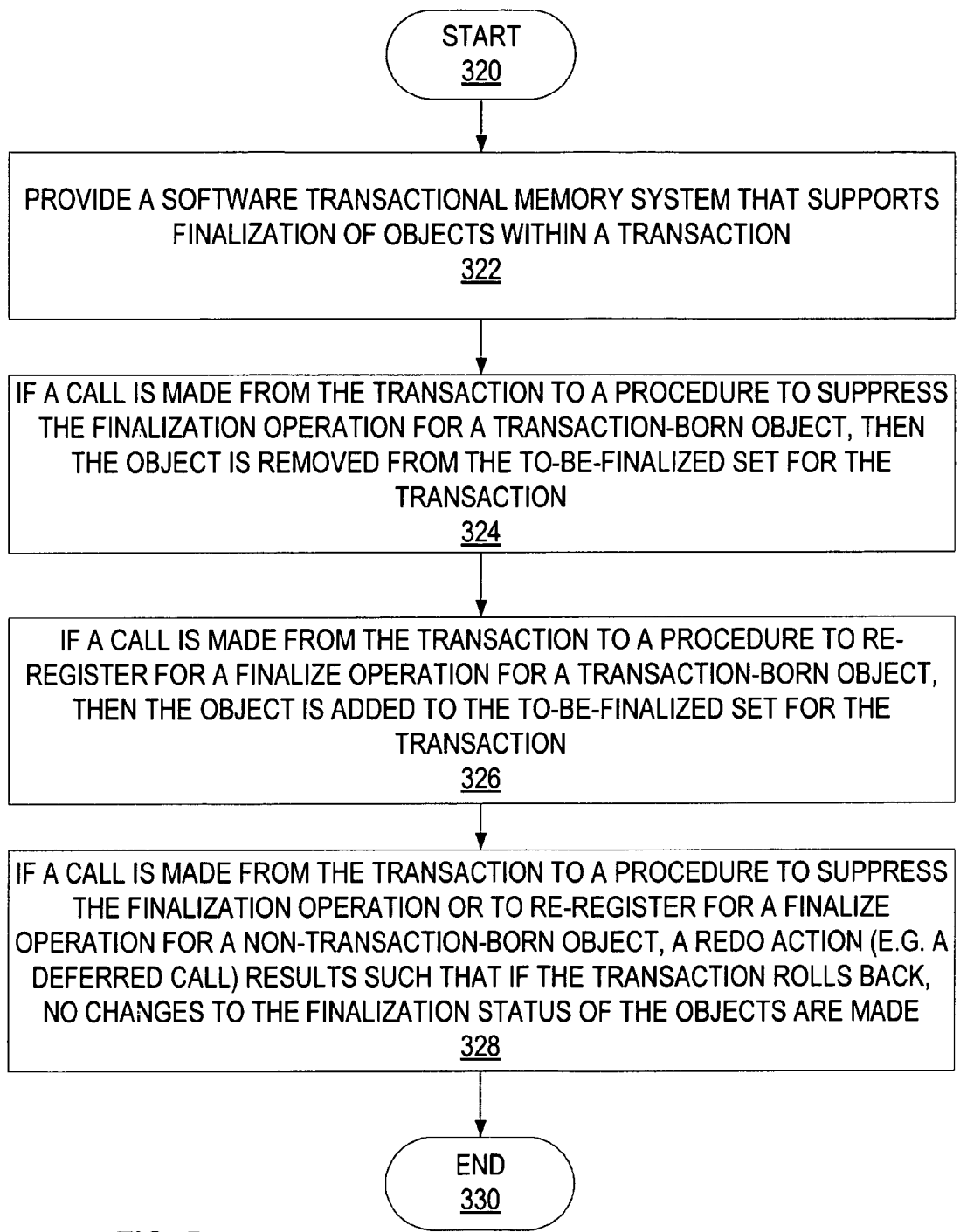
FIG. 5 is a process flow diagram for one implementation of the system of FIG. 1 illustrating the stages involved in handling requests to suppress or re-register for a finalize operation for an object.

FIG. 5 illustrates one implementation of the stages involved in handling requests to suppress or re-register for a finalize operation for an object. In the programming world, suppressing finalization for an object is typically used when an object's external state has been eagerly reclaimed, alleviating the need for the garbage collector to subsequently run the object's finalize method. Similarly, re-registering an object for finalization is used when, after such a suppression operation, state is changed such that the finalize method once again must be called by the garbage collector once the object has become unreachable. Some of the techniques discussed in FIG. 5 and in other figures deal with handling these requests when finalization techniques are used in software transactional memory systems to ensure a proper system state is maintained.

In one form, the process of FIG. 5 is at least partially implemented in the operating logic of computing device 100. The procedure begins at start point 320 with providing a software transactional memory system that supports finalization of objects within a transaction (stage 322). If a call is made from the transaction to a procedure to suppress the finalization operation for a transaction-born object (i.e. one that is allocated inside a transaction), then the object is removed from the to-be-finalized set for the transaction (stage 324). If a call is made from the transaction to a procedure to re-register for a finalized operation for a transaction-born object, then the object is added to the to-be-finalized set for the transaction (stage 326). If a call is made from the transaction to a procedure to suppress the finalization operation or to re-register for a finalization operation for a non-transaction-born object, a REDO action (e.g. a deferred call that is invoked by the transaction system only at commit time) results such that if the transaction rolls back, no changes to the finalization status of the objects are made (stage 328). The procedure ends at end point 330.

Figure 6:
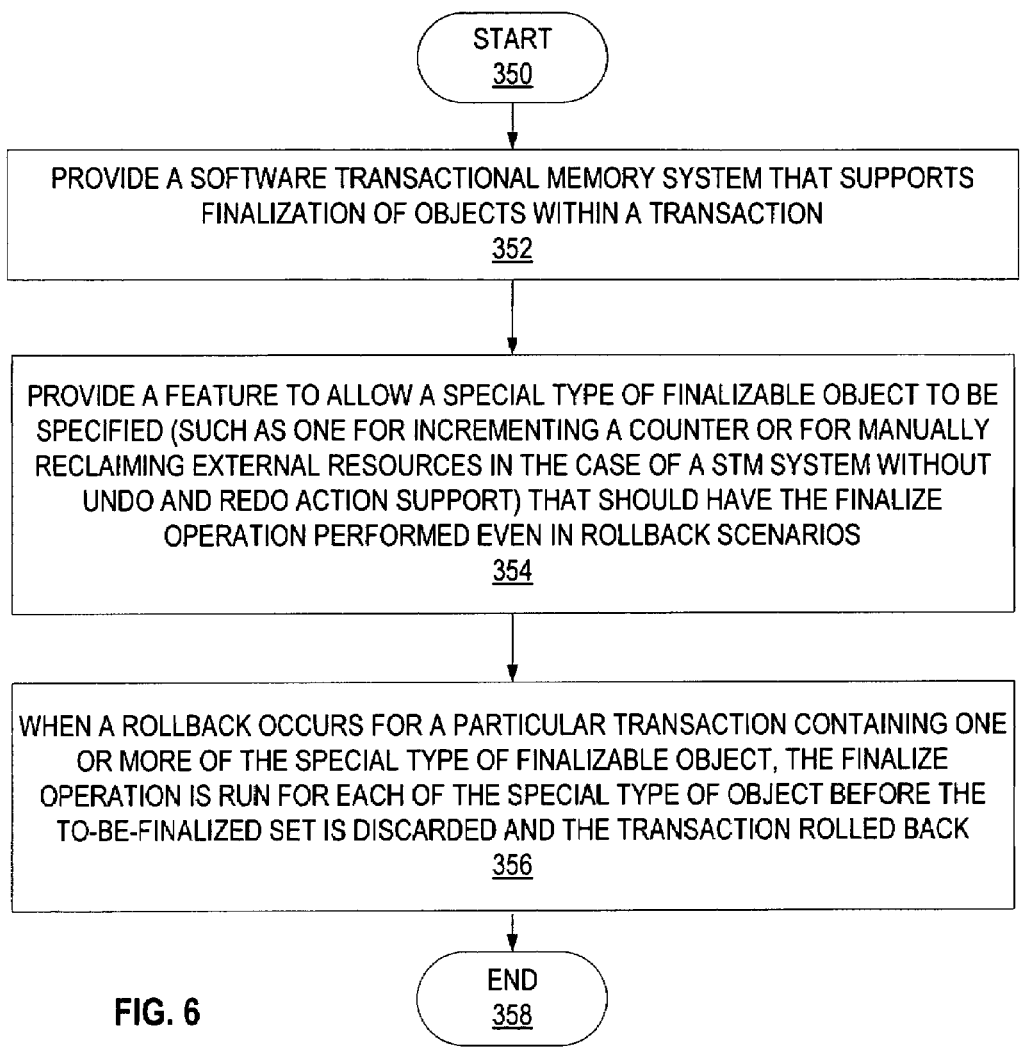
FIG. 6 is a process flow diagram for one implementation of the system of FIG. 1 illustrating the stages involved in allowing a special type of finalizable object to be specified that should have the finalize operation performed even in rollback scenarios.

FIG. 6 illustrates one implementation of the stages involved in allowing a special type of finalizable object to be specified that should have the finalize operation performed even in rollback scenarios. In one form, the process of FIG. 6 is at least partially implemented in the operating logic of computing device 100. The procedure begins at start point 350 with providing a software transactional memory system that supports finalization of objects within a transaction (stage 352). A feature is provided to allow a special type of finalizable object to be specified (such as one for incrementing a counter or for manually reclaiming external resources in the case of a STM system without UNDO and REDO action support) that should have the finalize operation performed even in rollback scenarios (stage 354). When a rollback occurs for a particular transaction containing one or more of the special type of finalizable object, the finalized operation is run for each of the special type of objects, while the objects are still comprised of their pre-rollback state, before the to-be-finalized set is discarded and the transaction rolled back (stage 356). The procedure ends at end point 358.

Figure 7:
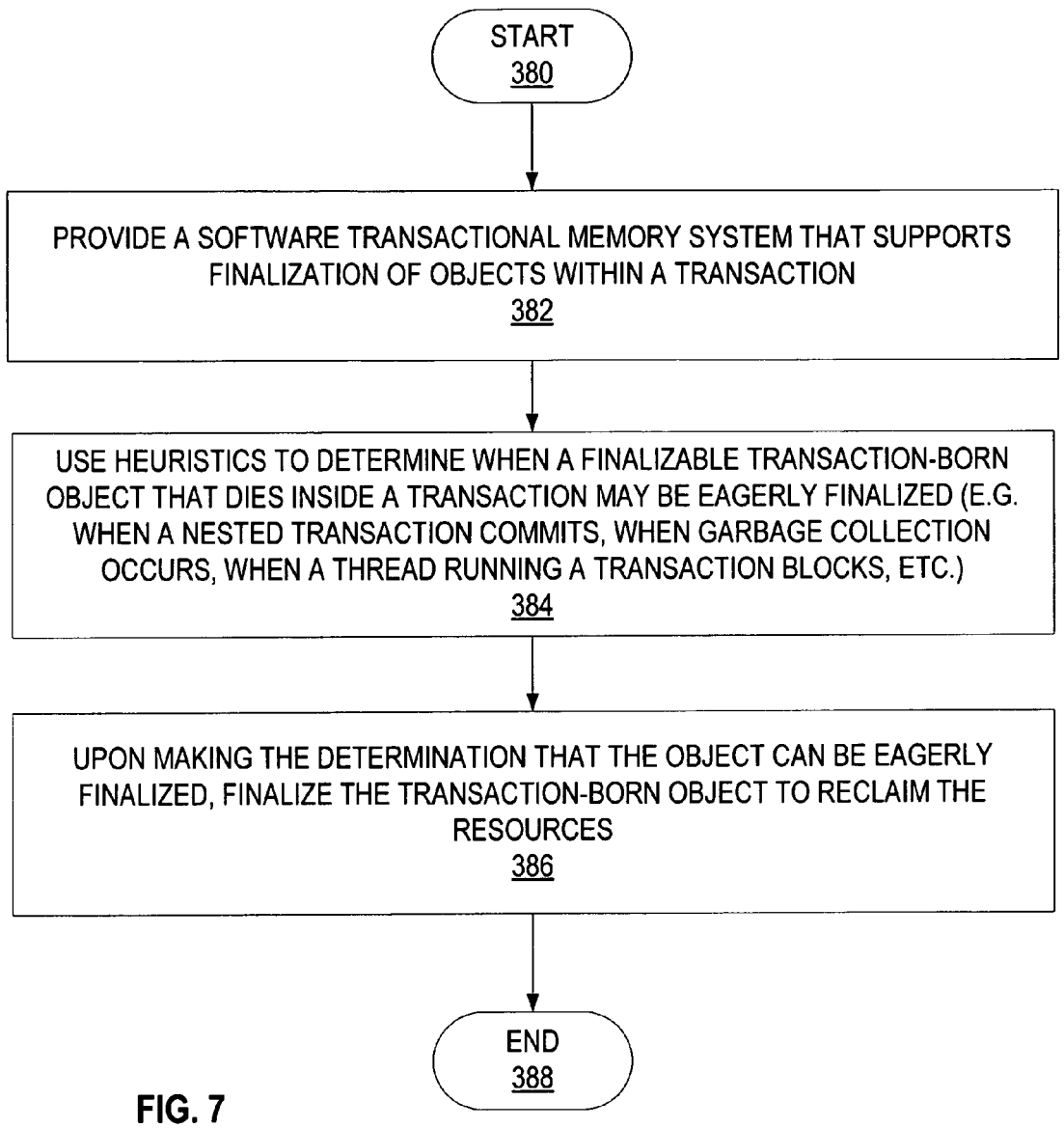
FIG. 7 is a process flow diagram for one implementation of the system of FIG. 1 that illustrates the stages involved in using heuristics to determine when an object may be eagerly finalized.

FIG. 7 illustrates one implementation of the stages involved in using heuristics to determine when an object may be eagerly finalized, permitting subsequent eager memory reclamation. In one form, the process of FIG. 7 is at least partially implemented in the operating logic of computing device 100. The procedure begins at start point 380 with providing a software transactional memory system that supports finalization of objects within a transaction (stage 382). Heuristics are used to determine when a finalizable transaction-born object that dies inside a transaction may be eagerly finalized (e.g. when a nested transaction commits, when garbage collection occurs, when a thread running a transaction blocks, etc.) (stage 384). In one implementation, since finalization generally reclaims resources, eager finalization is useful because otherwise resources allocated within a long-running transaction could not be reclaimed until the end of that transaction. Eager finalization allows at least some resources to be reclaimed before the transaction completes. Upon making the determination that the object can be eagerly finalized, the transaction-born object is manually finalized inside of the transaction to reclaim the resources (stage 386), which involves executing the object's finalize method and removing it from the transaction's to-be finalized set. The procedure ends at end point 388.

Figure 8:
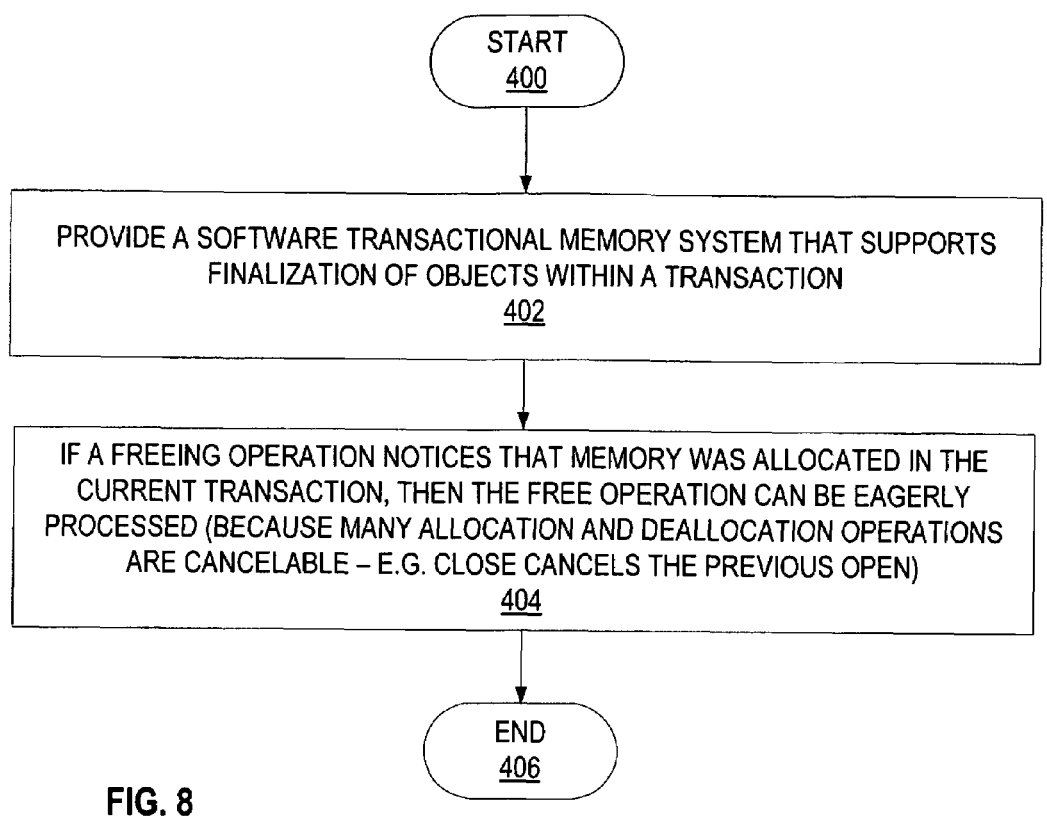
FIG. 8 is a process flow diagram for one implementation of the system of FIG. 1 that illustrates the stages involved in identifying and performing a free operation eagerly.

FIG. 8 illustrates one implementation of the stages involved in identifying and performing a free operation eagerly. In one form, the process of FIG. 8 is at least partially implemented in the operating logic of computing device 100. The procedure begins at start point 400 with providing a software transactional memory system that supports finalization of objects within a transaction (stage 402). If a freeing operation notices that memory was allocated in the current transaction, then the free operation can be eagerly processed (because many allocation and deallocation operations are cancelable—e.g. close cancels the previous open) (stage 404). This generally applies to any pair of DO/UNDO actions in which the outcome of executing either of the two is the same, i.e. regardless of a transaction committing or rolling back, the resultant program state is identical. Suppose, for example, that a transaction performs operation A, registering operation NOT A as an undo action (which would normally be deferred), but then later performs NOT A during the transaction. NOT A can be executed immediately, since it will be executed on either commit or rollback. The procedure ends at end point 406.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for using finalizable objects in transactions in a software transactional memory system operating on a computing device, comprising the steps of:
providing a software transactional memory system in a managed code environment comprising a garbage collector that reclaims memory used by a transaction, the software transactional memory system controls access to shared memory in a concurrent computing system;
providing a to-be-finalized set for the transaction in the software transactional memory system that supports allocation of finalizable objects inside the transaction to indicate to the garbage collector that a particular one or more of the objects are eligible for finalization;
allocating a finalizable object within the transaction;
placing an object into the to-be-finalized set for the transaction upon allocation of the finalizable object;
determining whether the transaction is to be committed;

if the transaction is to be committed, determining whether the transaction is a closed, flattened or parallel nesting transaction; and
if the transaction is a closed, flattened or parallel nesting transaction, copying contents of the to-be-finalized set for the transaction to a to-be-finalized set of a parent transaction of the transaction
if the transaction is not a closed, flattened or parallel nesting transaction, traversing contents of the to-be-finalized set for the transaction setting an indicator to indicate the finalizable object is eligible for finalization by the garbage collector;
if the transaction is not to be committed, determining whether the transaction is to be rolled back; and, if the transaction is to be rolled back, discarding contents of the to-be-finalized set for the transaction.

2. The method of claim 1, wherein if a request is made from the transaction to suppress a finalization operation for a particular object created within the transaction, the particular object is removed from the to-be-finalized set for the transaction.

3. The method of claim 1, wherein if a request is made from the transaction to re-register for a finalize operation for a particular object created within the transaction, the particular object is added to the to-be-finalized set for the transaction.

4. The method of claim 1, wherein if a request is made from the transaction to suppress a finalization operation for a particular object that was not created within the transaction, then a REDO action results.

5. The method of claim 1, wherein if a request is made from the transaction to re-register for a finalize operation for a particular object that was not created within the transaction, then a REDO action results.

6. A computer-readable medium having computer-executable instructions for causing a computer to perform the steps recited in claim 1.

7. A computer-readable medium having computer-executable instructions for causing a computer to perform steps comprising:
provide a software transactional memory system in a managed code environment comprising a garbage collector that reclaims memory used by a transaction, the software transactional memory system supports allocation of finalizable objects inside a transaction;
provide a to-be-finalized set for a transaction;
allocate a finalizable object within the transaction;
place an object into the to-be-finalized set for the transaction upon allocation of the finalizable object within the transaction;
determining whether the transaction is to be committed;
if the transaction is to be committed, determining whether the transaction is a closed, flattened or parallel nesting transaction; and
if the transaction is a closed, flattened or parallel nesting transaction, copying contents of the to-be-finalized set for the transaction to a to-be-finalized set of a parent transaction of the transaction
if the transaction is not a closed, flattened or parallel nesting transaction, traversing contents of the to-be-finalized set for the transaction setting an indicator to indicate the finalizable object is eligible for finalization by the garbage collector;
if the transaction is not to be committed, determining whether the transaction is to be rolled back; and, if the transaction is to be rolled back, discarding contents of the to-be-finalized set for the transaction.

8. A method for using finalizable objects in transactions in a software transactional memory system operating on a computing device, comprising the steps of:
providing a software transactional memory system in a managed code environment comprising a garbage collector that reclaims memory used by a transaction, the software transactional memory system supports allocation of finalizable objects inside a transaction;
creating a to-be-finalized set for a transaction;
whenever a finalizable object is allocated while a transaction is alive, placing the finalizable object into the to-be-finalized set for the transaction; and
if the transaction is ready to commit, determining whether the transaction is a closed, flattened or parallel nesting transaction;
if the transaction is a closed, flattened or parallel nesting transaction, copying contents of the to-be-finalized set for the transaction to a to-be-finalized set of a parent transaction of the transaction; and
if the transaction is an open nested or non-nested transaction, then traversing the to-be-finalized set and setting a finalize indicator for each object to indicate to the garbage collector that each object is eligible to finalize
if the transaction is not a closed, flattened or parallel nesting transaction, traversing contents of the to-be-finalized set for the transaction setting an indicator to indicate the finalizable object is eligible for finalization by the garbage collector;
if the transaction is not ready to be committed, determining whether the transaction is to be rolled back; and, if the transaction is to be rolled back, discarding contents of the to-be-finalized set for the transaction.

9. The method of claim 8, further comprising:
if the transaction is ready to commit, performing at least one other task associated with the commit.

10. The method of claim 8, further comprising:
if the transaction is ready to rollback, performing at least one other task associated with the rollback.

11. The method of claim 8, wherein the finalize indicator is set to a value of True for each object in the to-be-finalized set to indicate when each object is ready to be finalized.

12. A computer-readable medium having computer-executable instructions for causing a computer to perform the steps recited in claim 8.

* * * * *